Figure 1:
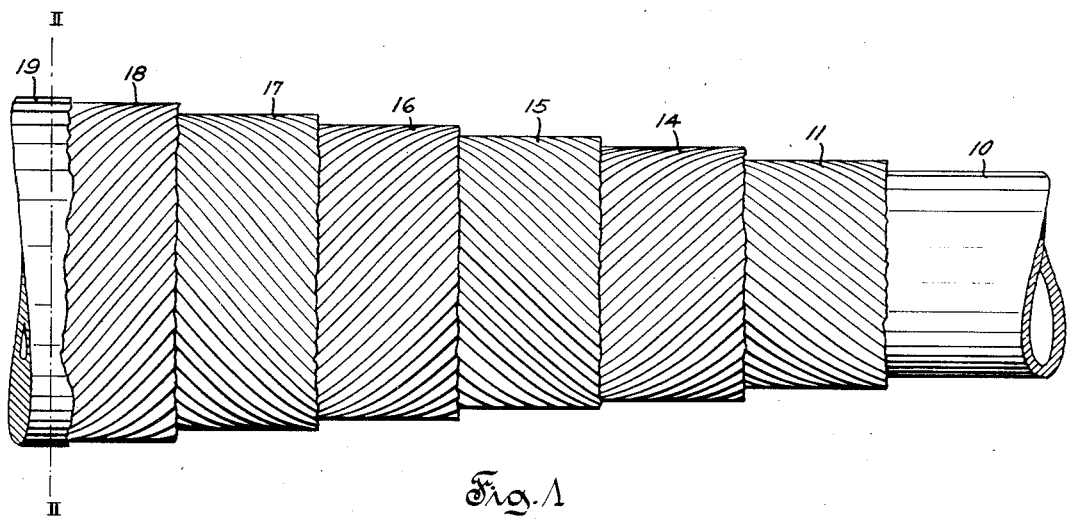

R. B. WILLIAMSON.
CONDUCTOR.
APPLICATION FILED JAN. 24, 1916.

1,209,096.

Patented Dec. 19, 1916.

Inventor
R. B. Williamson
by
Attorney

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CONDUCTOR.

1,209,096.  Specification of Letters Patent.  Patented Dec. 19, 1916.

Application filed January 24, 1916. Serial No. 74,507.

*To all whom it may concern:*

Be it known that I, ROBERT B. WILLIAMSON, a citizen of the United States, residing at Milwaukee, in the county of Milwaukee and State of Wisconsin, have invented a certain new and useful Improvement in Conductors, of which the following is a specification.

This invention relates in general to conductors and has particular relation to conductors of comparatively large size especially adapted for use in slotted cores of dynamo-electric machines.

In dynamo-electric machines of large size, especially alternating current machines, where the conductors carry a current of a pulsating character, a conductor, if in a single piece, that is, if the conductor is not divided into a plurality of parallel branches in a slot of the core, has excessive eddy currents induced therein. The losses that result from these eddy currents in comparatively large machines, where the conductors are not divided into a plurality of parallel branches, may be of a decidedly appreciable amount. However, where the conductors are divided and arranged in parallel strands, the eddy current effects are diminished to some extent. In order to practically fully neutralize the inductive effects producing these eddy currents or circulating currents in the several strands, the latter may be transposed or twisted about each other and insulated one from another. However, a stranded conductor with its current carrying parts transposed to neutralize eddy current effects is most expeditiously manufactured in the form of a round cable, a type of conductor which is not especially well adapted for use in the core slots of dynamo-electric machines of most efficient design.

In accordance with this invention, a composite conductor is made up of a plurality of separate strands transposed to neutralize eddy current effects, the conductor being formed by winding a plurality of superposed layers of conductors, preferably insulated one from another, about a tubular core of conductive material, the resulting structure being so pressed or swaged as to distort or flatten the core and give the assembled conductor a generally oval or other shape most desirable for insertion in the slots of a dynamo-electric machine, the core being such as gives the assembled conductor the rigidity required to maintain it in any position to which it is bent in being disposed in operative position on the core.

It is an object of this invention to provide a stranded conductor of improved construction especially adapted for use in a dynamo-electric machine.

It is a further object of this invention to provide a novel method of forming a stranded conductor.

These and other objects are attained by this invention, the various novel features of which will appear from the description and drawings, disclosing one embodiment of such invention, and will be particularly pointed out in the claims.

Figure 2:
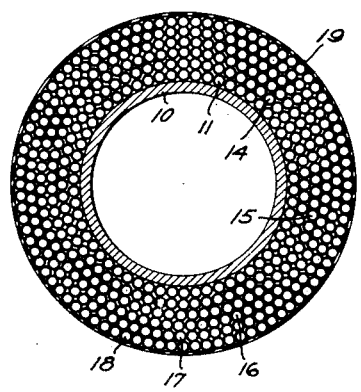
Figure 3:
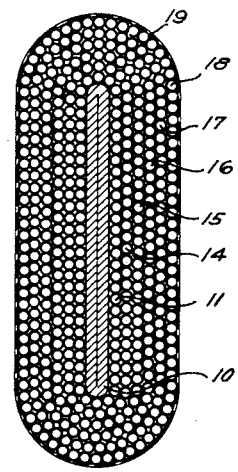

In the accompanying drawings: Figure 1 is a view in elevation of a conductor embodying features of this invention, in a preliminary stage of its construction, portions of the conductor being removed to show the interior structure thereof. Fig. 2 is a cross section on the line II—II of Fig. 1. Fig. 3 is a cross section similar to that of Fig. 2, subsequent to the pressing or swaging operation that gives the assembled conductor its final form.

In carrying this invention into effect, a tubular core 10, preferably cylindrical and of copper or other conductive material, is provided. A plurality of wires 11, insulated one from another, preferably by providing each with a thin insulating covering, as by oxidation, enameling, or other suitable means, to break up the path for eddy currents, the insulation being indicated at 12, are disposed in parallel relation, preferably in contact with each other, on the core 10, being spirally wound thereon at any desired and suitable pitch. A similar layer 14 of insulated conductors similarly wound is disposed over the layer 11, the conductors of the two layers being spirally wound in opposite directions, the pitch being preferably the same. Characters 15, 16, 17 and 18 indicate any desired number of similar layers of parallel and spirally wound insulated conductors, adjacent layers being spirally wound in opposite directions. The outer layer of conductors is provided with an insulating coating 19 which may be in the form of one or more layers of spirally wound strip material or in the form of a woven tubular fabric, or, in fact, both types of covering may be used. The core is preferably of such thickness as to be sufficiently rigid to maintain its cylindrical form during the operation of assembling the conductive elements thereon while being capable of being readily flattened on itself to alter the cross-sectional shape of the assembled structure.

In order that the utility of the conductor structure described may be promoted, the assembled structure, of the form shown in Figs. 1 and 2, is subjected to a swaging or pressing operation to change its cross sectional shape to that indicated in Fig. 3, wherein the tubular core is flattened, the sides thereof being folded over into substantial engagement so as to render the core substantially solid, and the individual insulated wires occupying substantially the same relative positions, although being slightly rearranged during the pressing or swaging operation to enable them to follow the modified contour of the core. The insulating cover 19 may be disposed on the assembled structure made up of the core and insulated wires either before the pressing or swaging operation or subsequent thereto.

It will be obvious that by choosing a hollow core of the proper diameter and thickness, a final conductor of practically any desired cross-sectional dimensions may be produced when the structure is distorted or flattened to bring the opposite sides of the core adjacent to or upon each other, as indicated in Fig. 3.

It will be apparent that there is provided, in accordance with this invention, a composite conductor of any desired size or cross-sectional shape, especially adapted for use in slots of dynamo-electric machines, composed almost entirely of conductive material, and comprising a number of conductive elements transposed relatively to each other to reduce eddy current losses to a minimum.

It should be understood that it is not desired that the invention claimed be limited to the exact details of construction shown and described, for obvious modifications will occur to a person skilled in the art.

It is claimed and desired to secure by Letters Patent:

1. A composite conductor for dynamo-electric machines, comprising a substantially solid, flattened core of conductive material formed from a tubular element, and conductors spirally wound about said core.

2. A composite conductor for dynamo-electric machines, comprising a substantially solid core of conductive material formed from an originally tubular element, and conductors spirally wound about said core and insulated one from another.

3. A composite conductor for dynamo-electric machines, comprising a substantially solid core of conductive material having portions folded over into substantial contact with each other, and conductors spirally wound about said core.

4. A composite conductor for dynamo-electric machines comprising a substantially solid, flat core of conductive material formed from an originally tubular element, and a plurality of layers of conductors spirally wound about said core, the conductors of adjacent layers being spirally wound in opposite directions.

5. A composite conductor adapted for windings of dynamo-electric machines, comprising a substantially solid, flat core of conductive material formed from an originally substantially cylindrical tubular element and having portions folded over into substantial contact with each other, and a plurality of layers of conductors spirally wound upon said core, the conductors of adjacent layers being spirally wound in opposite directions.

6. The method of forming a composite conductor for dynamo-electric machines, which comprises winding a plurality of strands of conductive material about a tubular core of conductive material, and pressing or swaging the assembled conductor to flatten said core and force opposite sides thereof into substantial contact with each other.

7. The method of forming a composite conductor for dynamo-electric machines which comprises winding a plurality of superposed layers of insulated conductors about a tubular core of conductive material of substantially circular cross-section with the conductors of adjacent layers spirally wound in opposite directions, and pressing or swaging the assembled conductor to flatten said core and bring opposite sides thereof into substantial contact with each other.

8. A composite conductor for dynamo-electric machines comprising a flattened core of conductive material formed from a tubular element, and conductors spirally wound about said core.

9. A composite conductor for dynamo-electric machines comprising a core of conductive material formed from an originally cylindrical tubular element distorted to a generally oval shape, and conductors spirally wound about said core.

10. A composite conductor for dynamo-electric machines comprising a core of conductive material of generally oval shape, and conductors spirally wound about said core.

11. The method of forming a composite conductor for dynamo-electric machines, which comprises winding a plurality of strands of conductive material about a tubular core of conductive material, and pressing or swaging the assembled elements of conductive material to substantially alter the cross-sectional shape of said core.

12. The method of forming a composite conductor for dynamo-electric machines, which comprises winding a plurality of insulated strands of conductive material about a substantially cylindrical tubular core of conductive material, and pressing or swaging the assembled elements of conductive material to distort said assembled elements and render the composite conductor generally oval in cross-sectional shape.

In testimony whereof, the signature of the inventor is affixed hereto.

ROBERT B. WILLIAMSON.